A. A. MOUCHET.
MACHINE FOR DRIVING POSTS AND WELL TUBING.
APPLICATION FILED JUNE 19, 1911.
1,019,687.
Patented Mar. 5, 1912.
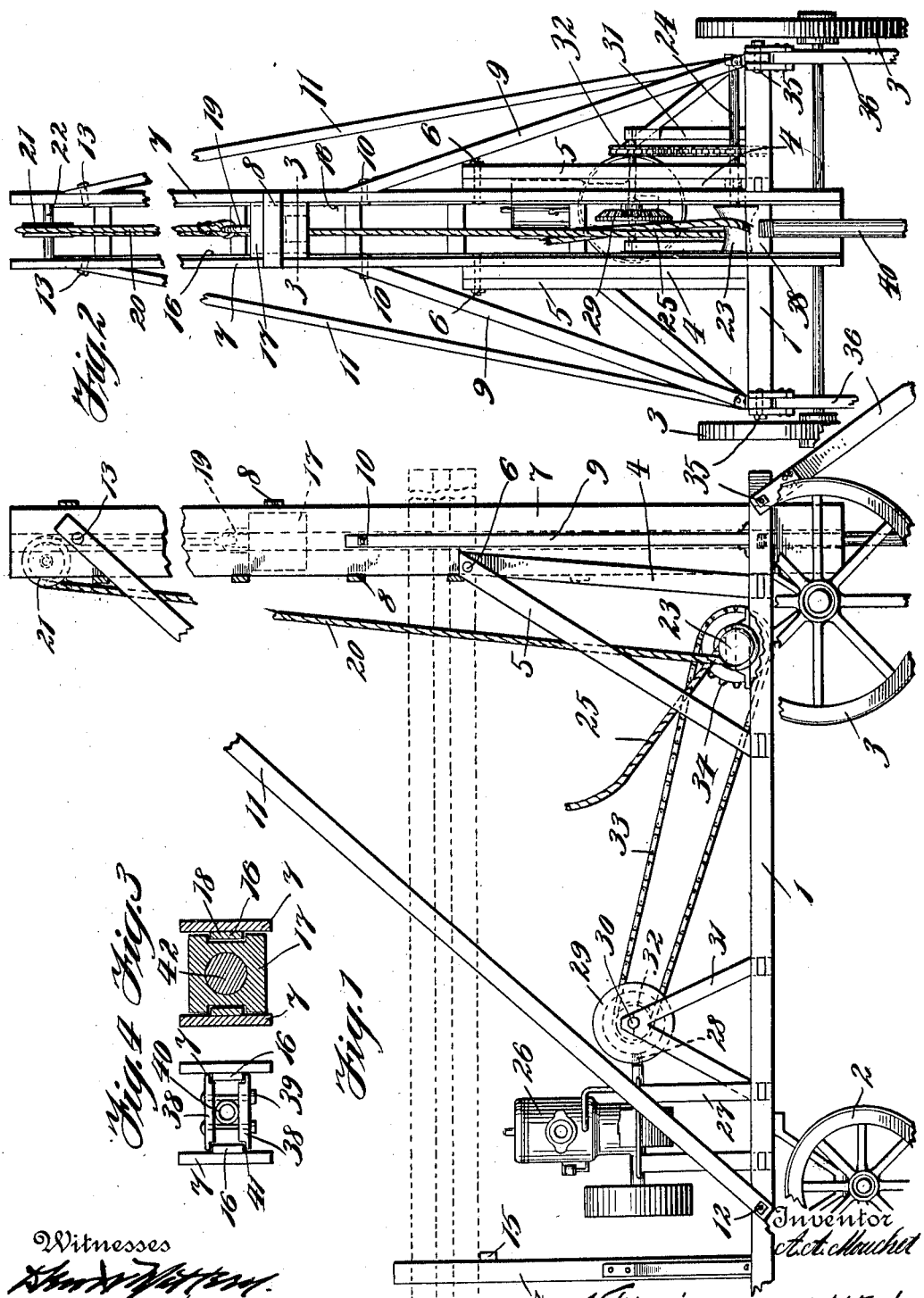

UNITED STATES PATENT OFFICE.

ALBERT A. MOUCHET, OF YOUNGSVILLE, LOUISIANA.

MACHINE FOR DRIVING POSTS AND WELL-TUBING.

1,019,687. Specification of Letters Patent. Patented Mar. 5, 1912.

Application filed June 19, 1911. Serial No. 634,035.

*To all whom it may concern:*

Be it known that I, ALBERT A. MOUCHET, a citizen of the United States, residing at Youngsville, in the parish of Lafayette and State of Louisiana, have invented certain new and useful Improvements in Machines for Driving Posts and Well-Tubing; and I do hereby declare the following to be a full, clear, and exact description of the invention, such as will enable others skilled in the art to which it appertains to make and use the same.

This invention relates to improvements in machines for driving wells, and has for its object to provide a machine for driving wells, and also for driving posts and well tubing.

A further object of the invention is to provide a portable machine of simple construction having a pivoted mast which may be lowered to allow the machine to pass under telegraph wires and trees.

With the above and other objects in view, the invention consists in certain combinations and arrangements of the parts hereinafter described, and the novel features thereof will be particularly pointed out in the appended claims.

The preferred embodiment of my invention is illustrated in the accompanying drawings, in which like characters of reference indicate corresponding parts.

Figure 1 is a side elevation of a machine embodying my invention; Fig. 2 is an end elevation of same; Fig. 3 is a section on the line 3—3 of Fig. 2; Fig. 4 shows a guiding means for holding a pipe or post.

In the drawings, 1 represents the frame of the machine, which is suitably supported on a pair of forward wheels 2 and rear wheels 3. Projecting upwardly from the rear end of the frame 1 centrally between the supporting wheels 3 are a pair of spaced uprights 4, from the upper portions of which extend forwardly inclined brace bars 5 to the frame 1.

Pivotally connected to the uprights 4 by means of bolts 6 is a mast formed of side members 7 connected together by cross pieces 8 which are secured to their edges at suitable intervals. The mast is braced laterally from the frame 1 of the machine by bars 9 connected to the side members 7 by removable bolts 10, and in the opposite direction by forwardly and laterally inclined bars 11 removably connected to the frame by bolts 12 and to the upper portion of the mast by bolts 13. In order to lower the mast, the bolts 10, 12 and 13 are removed and the mast may then be swung on the pivot bolts 6 to the horizontal position shown in dotted lines, in which position it is supported between uprights 14 projecting from the forward end of the frame 1 and on a cross bar 15 connected to said uprights.

To the inner faces of the side members 7 are secured guides 16 on which slides a drop hammer 17, recessed as at 18 for engaging the guides. The drop hammer 17 is provided with an eye 19, to which is attached a rope or cable 20 which passes over a grooved sheave 21 carried by a shaft 22 supported near the top of the side members 7 of the mast, and then around a winding drum 23 fixed to a shaft 24 journaled on the frame 1 of the machine. The free end 25 of the rope or cable 20 is held by the operator to cause the rope to wind on the drum 23 to raise the drop hammer, and when the rope is released the drop hammer falls by gravity. The drum is rotated preferably by means of a gasolene engine 26 carried by upwardly projecting brackets 27 secured to the forward end of the frame of the machine. The engine shaft carries a bevel pinion 28 which meshes with a bevel gear 29 fixed to a shaft 30 journaled in brackets 31 and carrying a sprocket wheel 32, over which passes an endless chain 33 leading to a sprocket wheel 34 fixed to the drum shaft 24.

Rigidly connected at the rear end of the frame 1 as at 35, are braces 36 having a sharpened end 37 for engaging the ground when lowered to steady the machine and prevent it from moving when in operation.

In order to properly guide the pipe or post being driven, a clamp is provided comprising a pair of members 38 adjustably secured together by bolts 39 for embracing the pipe or post 40, and having their inner faces at their ends recessed as at 41 to slidably engage the guides 16. The drop hammer 17 is preferably provided with a block of wood or lead 42 seated in its striking face for preventing injury to the threaded upper end of the pipe or the top of the post operated upon.

From the above it is thought the construction, operation and advantages of my invention will be appreciated by those skilled in the art to which it pertains without further description.

It is to be understood that slight changes in the details of construction and arrangement of the parts may be resorted to without departing from the spirit of the invention.

Having fully described my invention, what I claim is:—

1. In a machine of the class described, the combination of a frame, spaced uprights projecting from the frame, a mast formed of spaced side members pivotally connected to the uprights, braces extending from the frame and removably connected to the mast for holding it in a vertical position, a drop hammer slidably mounted between the side members, a sheave rotatably mounted between the side members at the upper ends thereof, a rope attached to the drop hammer and passing over said sheave, a drum rotatably mounted on the frame, means for rotating the drum, the rope passing around said drum and adapted to be held at its free end by an operator for raising the drop hammer, and means slidably mounted between said side members for holding a pipe in alinement with the drop hammer, substantially as described.

2. In a machine of the class described, the combination of a mast formed with spaced side members, guides on the inner faces of the side members, a drop hammer slidably mounted on the guides, means for raising the drop hammer, a clamp comprising a pair of members, and bolts adjustably securing said members together in sliding engagement with said guides and for holding a pipe in alinement with the drop hammer, substantially as described.

In testimony whereof, I affix my signature, in presence of two witnesses.

ALBERT A. MOUCHET.

Witnesses:
R. O. YOUNG,
P. H. DERPLINX.

---

Copies of this patent may be obtained for five cents each, by addressing the "Commissioner of Patents, Washington, D. C."